(12) United States Patent
Gopalakrishnan

(10) Patent No.: US 10,482,229 B2
(45) Date of Patent: Nov. 19, 2019

(54) METHOD OF PROVIDING CONTENT ACCESS PERMISSION TO A USER AND A DEVICE THEREOF

(71) Applicant: WIPRO LIMITED, Bangalore (IN)

(72) Inventor: Subramonian Gopalakrishnan, Ernakulam (IN)

(73) Assignee: Wipro Limited, Bangalore (IN)

( * ) Notice: Subject to any disclaimer, the term of this patent is extended or adjusted under 35 U.S.C. 154(b) by 144 days.

(21) Appl. No.: 15/682,575

(22) Filed: Aug. 22, 2017

(65) Prior Publication Data
US 2019/0005214 A1    Jan. 3, 2019

(30) Foreign Application Priority Data

Jun. 30, 2017 (IN) .............................. 201741023096

(51) Int. Cl.
*G06F 21/32* (2013.01)
*G06T 7/62* (2017.01)
*G06F 21/62* (2013.01)

(52) U.S. Cl.
CPC .......... *G06F 21/32* (2013.01); *G06F 21/6218* (2013.01); *G06T 7/62* (2017.01); *G06F 2221/2149* (2013.01)

(58) Field of Classification Search
CPC ..... A61B 3/1216; A61B 5/117; A61B 5/1171; A61B 5/1112; A61B 3/107; A61B 5/0022; A61B 5/1172; G06K 9/00597; G06K 9/00906; G06K 9/4609; G06K 9/00617; G06K 9/00268; G06K 9/00281; G06K 9/6201; G06K 9/00885; G06K 9/52; G06K 9/00; G06K 9/18; G06K 9/4604; G06K 9/4652; G07C 9/00158; G06F 21/32; G06F 21/36; G06F 3/013; G06F 3/012;
(Continued)

(56) References Cited

U.S. PATENT DOCUMENTS 4,393,366 A * 7/1983 Hill .................. A61B 5/1171
                                                           382/117
5,291,560 A   3/1994 Daugman
(Continued)

OTHER PUBLICATIONS

Ronneburger, A., et al., "Growth of the cornea from infancy to adolescence", *Ophthalmic Physiol* Opt., Jan. 2006, 26(1): 80-7, abstract only, pp. 1-2.

*Primary Examiner* — Aklilu K Woldemariam
(74) *Attorney, Agent, or Firm* — Finnegan, Henderson, Farabow, Garrett & Dunner, LLP

(57) ABSTRACT

The method and device of present disclosure relates providing content access permission to a user of the device. The device comprises an image capturing unit to scan eyeballs of the user trying to access the device. The scanning results in generation of a current scanned eyeball image. The device further matches the current scanned eyeball image with a previously scanned eyeball image of an authorized user and plurality of scanned eyeball images of plurality of other users. Based on the matching, the device determines the user as the authorized user of the device or a guest. In case of authorized user, the device provides a complete access of the device to the authorized user. However, in case of guest user, the device determines the age of the guest user and then provides the access of contents and functionalities of the device based on the age of the guest user.

15 Claims, 3 Drawing Sheets

(58) Field of Classification Search
CPC .......... G06F 21/316; G06F 2221/2133; G06Q
10/10; G06Q 20/40975; G06T 7/62;
G06T 15/20; G06T 7/0012; G06T 7/20;
G06T 15/00; H04W 4/04; H04L 63/0861;
H04L 9/3231; H04L 63/0876; G02B
2027/014; G02B 2027/0141; G02B
2027/0187; G02B 27/0179; G02B
27/0172; G02B 27/0093; G02B
2027/0138; G02B 27/0101; H04N
21/23614; H04N 21/6587; H04N 21/816;
H04N 13/279; H04N 13/271; G01B
11/00; G01B 11/02; G07B 17/00661
USPC ......... 382/117; 351/205, 206, 221; 345/156,
345/419, 633
See application file for complete search history.

(56) References Cited

U.S. PATENT DOCUMENTS

| | | | | |
|---|---|---|---|---|
| 6,542,624 | B1* | 4/2003 | Oda | G06K 9/00597 |
| | | | | 382/117 |
| 8,560,004 | B1* | 10/2013 | Tsvetkov | H04M 1/67 |
| | | | | 310/328 |
| 9,530,150 | B2* | 12/2016 | Goldberg | G06Q 30/02 |
| 2003/0011758 | A1* | 1/2003 | Ochiai | G06F 21/32 |
| | | | | 356/71 |
| 2006/0210122 | A1* | 9/2006 | Cleveland | A61B 3/107 |
| | | | | 382/117 |
| 2009/0249079 | A1* | 10/2009 | Suzuki | G06F 21/32 |
| | | | | 713/186 |
| 2010/0301995 | A1* | 12/2010 | Nguyen | G05B 19/409 |
| | | | | 340/5.2 |
| 2012/0083667 | A1* | 4/2012 | Isogai | A61B 3/102 |
| | | | | 600/300 |
| 2012/0188510 | A1* | 7/2012 | Suehira | A61B 3/102 |
| | | | | 351/208 |
| 2013/0044055 | A1* | 2/2013 | Karmarkar | G06F 3/013 |
| | | | | 345/158 |
| 2013/0044129 | A1* | 2/2013 | Latta | G09G 5/00 |
| | | | | 345/633 |
| 2013/0083008 | A1* | 4/2013 | Geisner | G06T 19/006 |
| | | | | 345/419 |
| 2013/0083976 | A1* | 4/2013 | Ragland | G06F 3/011 |
| | | | | 382/117 |
| 2014/0050371 | A1* | 2/2014 | Inkumsah | G06F 21/32 |
| | | | | 382/117 |
| 2014/0125574 | A1* | 5/2014 | Scavezze | G06F 21/31 |
| | | | | 345/156 |
| 2014/0337634 | A1* | 11/2014 | Starner | H04L 9/3231 |
| | | | | 713/186 |
| 2015/0135309 | A1* | 5/2015 | Karmarkar | G06F 16/532 |
| | | | | 726/19 |
| 2015/0326570 | A1* | 11/2015 | Publicover | G06F 21/64 |
| | | | | 726/4 |
| 2016/0019421 | A1* | 1/2016 | Feng | G06K 9/00604 |
| | | | | 382/117 |
| 2016/0026253 | A1* | 1/2016 | Bradski | G02B 27/225 |
| | | | | 345/8 |
| 2016/0110669 | A1* | 4/2016 | Iyer | G06Q 10/06315 |
| | | | | 705/7.25 |
| 2017/0011210 | A1* | 1/2017 | Cheong | A61B 5/0022 |
| 2018/0232507 | A1* | 8/2018 | Zizi | G06F 21/32 |

* cited by examiner

METHOD OF PROVIDING CONTENT ACCESS PERMISSION TO A USER AND A DEVICE THEREOF

TECHNICAL FIELD

The present subject matter is related, in general to data analytics and more particularly, to a method and device for providing the content access permission to a user of the device.

BACKGROUND

The smartphones come with lot of useful functionalities which helps a user to perform various day-to-day activities. For example, the user may use the smartphones for online shopping, payments, reading news, playing online games, accessing emails, listening to music and the like. However, in spite of having such useful functionalities, there are chances of the smartphone getting misused by a third person. The portable nature of the smartphones makes them easily accessible to the third person. The third or other person can be any unrelated person or a person from our own family or relatives of different age groups.

Children are also attracted towards the smartphones, since they get a chance to play games or access other entertainment content. While playing the games, the children may come across inappropriate content through popup links. The inappropriate content may make the children uncomfortable or may also allow the children to perform unauthorized payment. In today's busy schedule, it is not always possible to keep the children under supervision when they are accessing the smartphones or other devices. Thus, providing an age-wise content access in the field of the devices like smartphones is a challenge.

SUMMARY

Disclosed herein is a method of providing content access permission to a user of a device. The method includes scanning at least one of eyeballs of the user trying to access the device. The scanning results in generation of a current scanned eyeball image. The method further includes matching the current scanned eyeball image with a previously scanned eyeball image of an authorized user of the device and plurality of scanned eyeball images of plurality of other users. Further, the method includes identifying the user, based on the matching, as the authorized user of the device when the current scanned eyeball image matches with the previously scanned eyeball image. Further, the method includes identifying the user, based on the matching, as a guest user when the current scanned eyeball image is matched with at least one of the plurality of scanned eyeball images. Further, the method includes providing, based on the identifying, a pre-defined content access permission to the authorized user. The method further includes determining an age of the guest user based on processing of the current scanned eyeball image relative to the at least one of the plurality of scanned eyeball images. The method further includes providing a restricted content access permission to the guest user based on the age determined for the guest user and permission policy associated with the age of the guest user.

Further, the present disclosure relates to a device for providing content access permission to a user of the device. The device comprises an image capturing unit to scan at least one of eyeballs of the user trying to access the device. The scanning results in generation of a current scanned eyeball image. The device further comprises a processor and a memory communicatively coupled to the processor. The memory stores processor-executable instructions, which, on execution, causes the processor to match the current scanned eyeball image with a previously scanned eyeball image of an authorized user of the device and plurality of scanned eyeball images of plurality of other users. The processor further identifies the user, based on the matching, as the authorized user of the device when the current scanned eyeball image matches with the previously scanned eyeball image. Further, the processor identifies the user, based on the matching, as a guest user when the current scanned eyeball image is matched with at least one of the plurality of scanned eyeball images. Further, the processor provides, based on the identification, a pre-defined content access permission to the authorized user. The processor further determines age of the guest user based on processing of the current scanned eyeball relative to the at least one of the plurality of scanned eyeball images. Further, the processor provides a restricted content access permission to the guest user based on the age determined for the guest user and permission policy associated with the age of the guest user.

Furthermore, the present disclosure relates to a non-transitory computer readable medium including instructions stored thereon that when processed by at least one processor cause a device to perform the acts of scanning at least one of eyeballs of the user trying to access the device. The scanning results in generation of a current scanned eyeball image. The instructions further cause the at least one processor to match the current scanned eyeball image with a previously scanned eyeball image of an authorized user of the device and plurality of scanned eyeball images of plurality of other users. Further, the instructions cause the at least one processor to identify the user, based on the matching, as the authorized user of the device when the current scanned eyeball image matches with the previously scanned eyeball image. The instructions further cause the at least one processor to identify the user, based on the matching, as a guest user when the current scanned eyeball image is matched with at least one of the plurality of scanned eyeball images. The instructions further cause the at least one processor to provide, based on the identification, a pre-defined content access permission to the authorized user. Further, the instructions further cause the at least one processor to determine an age of the guest user based on processing of the current scanned eyeball image relative to the at least one of the plurality of scanned eyeball images. The instructions further cause the at least one processor to provide a restricted content access permission to the guest user based on the age determined for the guest user and permission policy associated with the age of the guest user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
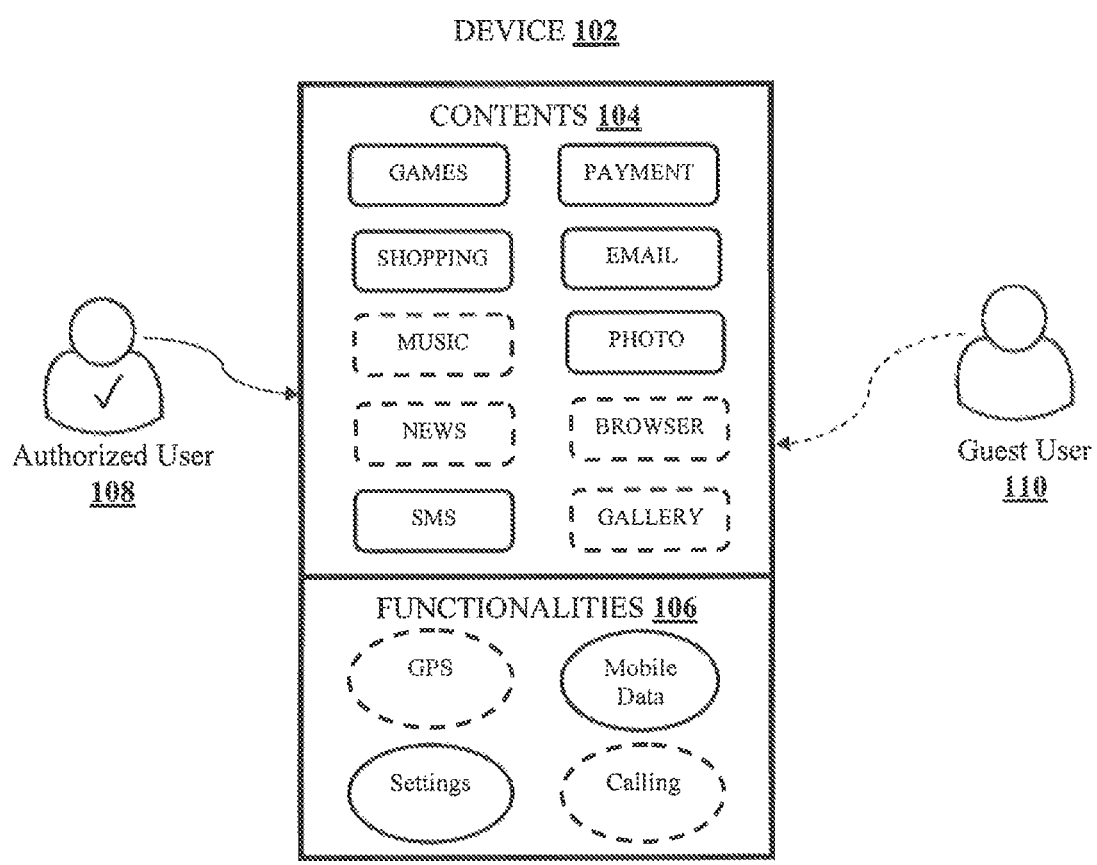
FIG. 1 is an exemplary environment for providing content access permission to a user of the device in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a device and a method for providing content access permission to a user of the device. The use of the devices like smartphones, laptops, notepads and like is increasing day by day. The device, for example smartphones, comes with various functionalities and also stores useful contents accessible by the user. The contents may include different applications for performing different activities. The contents may also include other features of the smartphones like messaging for sending text messages, gallery for storing multimedia data, and the like. Some of the contents may be accessed by using internet, for example, online gaming applications, shopping applications, browsers, and the like. While accessing such online contents, various popup links or icons appear on a screen of the device. The users may inadvertently click on such popup links or icons which may cause a display of unwanted contents or even a financial loss for the user.

The chances of inadvertently clicking on such popup links or icons increases when kids or children access the device without any supervision of their parents or authorized owner of the device. To prevent such unwanted access, the present disclosure discloses the device for providing content access, privileges based on age of an individual trying to access the device. The individual may be any person, a kid or any other person from family, relatives or friends. For determining the age, the device scans at least one of the eyeballs of the individual which results in generation of scanned eyeball image. The scanned eyeball image is further compared with pre-stored eye ball images to identify the individual. The individual may be the authorized user of the device or may be any third person.

If the individual is identified as the authorized user, he/she is provided with pre-defined access of the contents and functionalities of the device. However, if the individual is the third person, the device determines the age of the third person (also referred as a guest user) by computing an axial length and back scattering using the scanned eyeball image. The computed axial length and the back scattering is compared against a pre-stored age comparison index for determining the age of the guest user. Now, based on the age determined, the devices provide a restricted access of the contents to the guest user.

In the following detailed description of the embodiments of the disclosure, reference is made to the accompanying drawings that form a part hereof, and which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is an exemplary environment for providing content access permission to a user of the device in accordance with some embodiments of the present disclosure.

The environment 100 includes a device 102, an authorized user 108, and a guest user 110. The authorized user 108 may be an owner of the device 102, whereas the guest user 110 may be a third person like family member, kids, relatives, friends and the like. The device 102 shown in FIG. 1 is a smartphone. However, it should be understood to a person skilled in art that the device 102 may include, but is not limited to, other electronic devices like desktop, laptop, notepad, and the like. The device 102 may comprise various contents 104 including applications and other features, for example messaging and gallery, accessible by the authorized user 108. Some examples of the applications may include, but are not limited to, a game application, a payment application, a shopping application, an email application, a music application, photo, news application, and browser application. Further, the device 102 may also include various functionalities 106, for example global positing system (GPS), mobile data, settings, calling, and the like.

When any individual or user tries to access the device 102, at first, the device 102 scans at least one of the eyeballs of the user. The scanning results in generation of a scanned eyeball image. Based on the scanned eyeball image, authenticity and age of the user is determined. If the user is identified as the authorized user 108 (shown at left-hand side of the FIG. 1), the device 102 provides a complete or pre-defined access of the contents 104 and the functionalities 106 to the authorized user 108. In other words, the applications, features, and the functionalities 106 stored in the device 102 can be completely accessible by the authorized user 108.

However, if the user is identified as the guest user 110 (shown at right-hand side of the FIG. 1), the device 102 may not provide the complete access of the contents 104 and the functionalities 106 to the guest user 110. In this case, the age of the guest user 110 is determined first, which is explained in detail in subsequent paragraphs of the specification. Once the age is determined, the device 102 decides the accessibility of the contents 104 and the functionalities 106 based on the age. For example, if the guest user 110 is determined to be a kid of age group 4-9 years, then the applications indicated by solid or non-dotted lines may not be accessible. That is, the applications, for example game application, payment application, shopping application, an email application, photo may not be accessible to the guest user 110. The reason for such restricted access is privacy concerns of the authorized user 108 as well as to prevent any access of sensitive contents 104.

However, the other applications, which are shown as dotted-lines, may be accessible by the guest user 110. For example, the applications like music application, news application, browser application, short message service (SMS), and gallery may be accessible by the guest user 110. Also, the functionalities 106 like mobile data and settings may not be accessible by the guest user 110. Thus, the guest user 110 with limited access to the device 102 may not be able to access any unwanted content which may not be appropriate as per his/her age. This way, the device 102 may be used by people of different age groups with restricted access.

Figure 2:
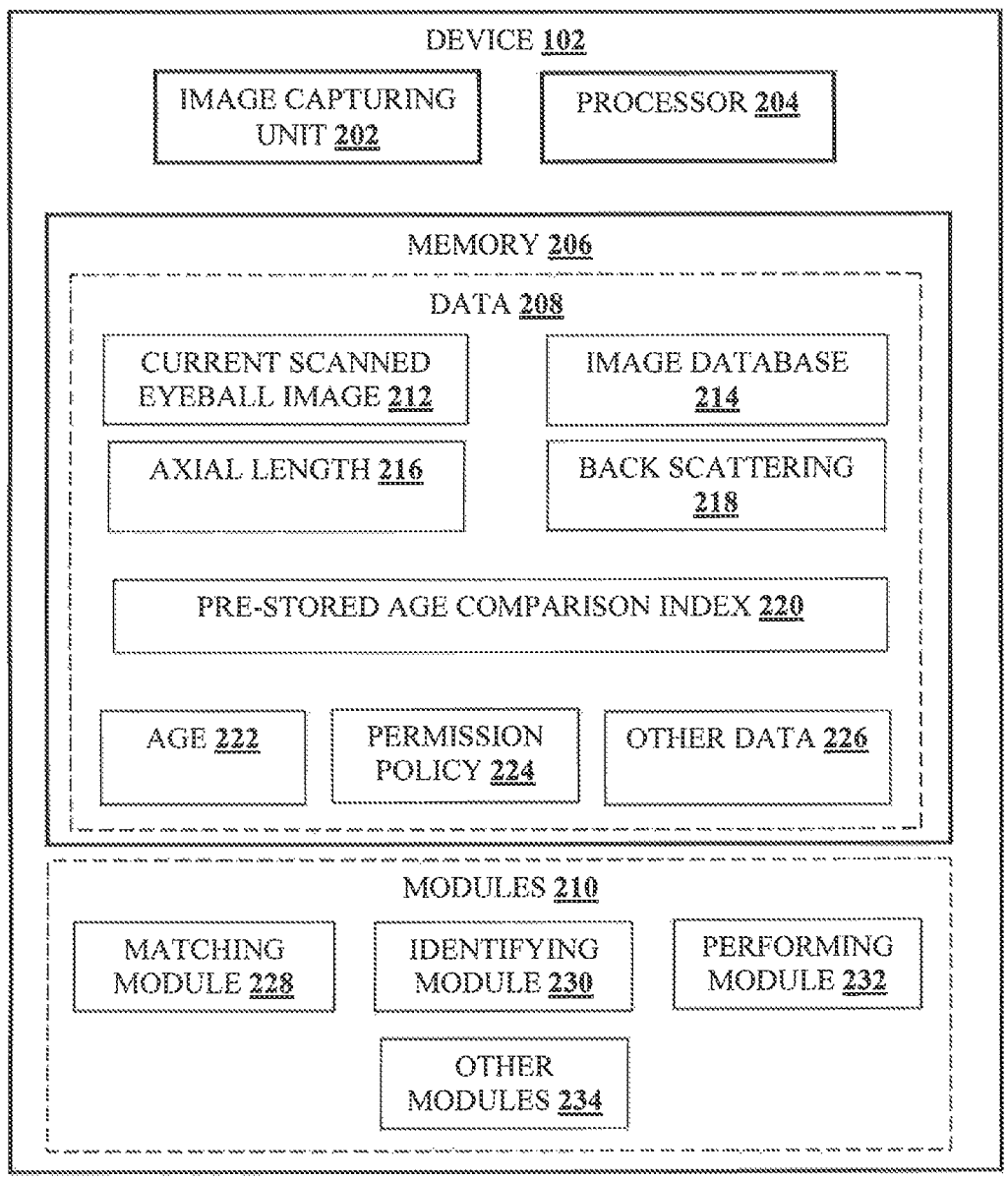
FIG. 2 is a detailed block diagram illustrating a device for providing content access permission to a user in accordance with some embodiments of the present disclosure.

FIG. 2 is a detailed block diagram illustrating a device for providing content access permission to a user in accordance with some embodiments of the present disclosure.

The device 102 may include an image capturing unit 202, a processor 204, a memory 206, data 208, and modules 210. The memory 206 may be communicatively coupled to the processor 204. The processor 204 may be configured to perform one or more functions of the device 102 for providing content access permission to a user. In one implementation, the device 102 may include the data 208 and the modules 210 for performing various operations in accordance with the embodiments of the present disclosure. In an embodiment, the data 208 may be stored within the memory 206 and may include, without limiting to, current scanned eyeball image 212, an image database 214, an axial length 216, hack scattering 218, pre-stored age comparison index 220, age 222, permission policy 224, and other data 226.

In some embodiments, the data 208 may be stored within the memory 205 in the form of various data structures. Additionally, the data 208 may be organized using data models, such as relational or hierarchical data models. The other data 226 may store data, including temporary data and temporary files, generated by the modules 210 for performing the various functions of the device 102.

In an embodiment, the current scanned eyeball image 212 may be an image of at least one of eyeballs of the user trying to access the device 102, scanned by the image capturing unit 202. In an embodiment, the image database 214 may store a previously scanned eyeball image of the authorized user 108 and a plurality of scanned eyeball images of a plurality of other users. As discussed earlier, the other users may be any third person from family, relatives, and friends.

In an embodiment, the axial length 216 and the back scattering 218 may be computed from the current scanned eyeball image 212 of user's eye identified as the guest user 110. In an embodiment, the pre-stored age comparison index 220 includes mapping between age 222 and corresponding axial length 216 and the back scattering 218.

In an embodiment, the age 222 indicates the age of the guest user 110 which may be determined by comparing the axial length 216 and the back scattering 218 with the pre-stored age comparison index 220. In an embodiment, the permission policy 224 may include different access privileges set by the authorized user 108 of the device 102. According to embodiments, the permission policy 224 may include disabling of one or more contents 104, enabling of the one or more contents 104, disabling one or more functionalities 106 of the device 102, enabling the one or more functionalities 106 of the device 102, access time of the one or more contents 104, and access location of the one or more contents 104.

In some embodiments, the data 208 may be processed by one or more modules 210 of the device 102. In one implementation, the one or more modules 210 may be stored as a part of the processor 204. In another implementation, the one or more modules 210 may be communicatively coupled to the processor 204 for performing one or more functions of the device 102. The modules 210 may include, without limiting to, a matching module 228, an identifying module 230, a performing module 232, and other modules 234.

As used herein, the term 'module' refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 234 may be used to perform various miscellaneous functionalities 106 of the device 102. It will be appreciated that such modules 210 may be represented as a single module or a combination of different modules.

In an embodiment, the image capturing unit 202 of the device 102 may scan at least one of eyeballs of the user trying to access the device 102. The scanning may result in generation of the current scanned eyeball image 212. In this process, image of eyes of the user is captured by the image capturing unit 202. From that eye image, an inner and outer boundary of iris (i.e., pupil and limbus) is localized to detect the at least one eyeballs and exclude eyelids, eyelashes, and specular reflections that often occlude parts of the iris. Once the at least one eyeballs are scanned, the matching module 228 of the device 102 may match the current scanned eyeball image 212 with the previously scanned eyeball image of the authorized user 108 of the device 102 and the plurality of scanned eyeball images of plurality of other users. The other users may include family members, relatives, kids or any other third-party individuals.

In an embodiment, the identifying module 230 of the device 102 may identify the user, based on the matching, as the authorized user 108 of the device 102 when the current scanned eyeball image 212 matches with the previously scanned eyeball image. Further, the identifying module 230 of the device 102 may identify the user, based on the matching, as the guest user 110 when the current scanned eyeball image 212 is matched with at least one of the plurality of scanned eyeball images stored in the image database 214. However, it may happen that the current scanned eyeball image 212 of the user may not match with the plurality of scanned eyeball images stored in the image database 214. In this scenario, the authorized user 108 may first unlock the device 102 by providing valid credentials, for example password, fingerprint or by scanning his/her eyeballs. Once the device 102 is unlocked, the authorized user 108 may handover the device 102 to the user whose current scanned eyeball image 212 has not matched with the plurality of scanned eyeball images stored in the image database 214. According to embodiments of present disclosure, such user may be identified as the guest 110 user. Now, when that guest user 110 start accessing the device 102, the device 102 may automatically activate the image capturing unit 202 to scan eyeballs of the guest user 110 to generate the current scanned eyeball image 212 which is further used for age determination. According to an alternative embodiment, the authorized user 108 may provide his/her instructions to the device 102 for scanning the eyeballs of the guest user 110 while handing over the device 102 to the guest user 110. This way, the device 102 may identify any new user, as the guest user 110, whose eyeball image is not stored in the image database 214.

Now, once the identity of the user is determined, the performing module 232 of the device 102 may provide a pre-defined content access permission to the authorized user 108. According to embodiments of the present disclosure, the pre-defined content access permission indicates that the authorized user 108 is provided with complete access of one or more contents 104 stored in the device 102 and one or more functionalities 106 associated with the device 102. As explained with respect to FIG. 1, the authorized user 108 may be able to access all the applications, features and functionalities 106 of the device 102.

However, for the guest user 110, the device 102 may not provide the complete access of the contents 104 and the functionalities 106. In case of the guest user 110, the performing module 232 may provide a restricted content access permission based on the age 222 determined for the guest user 110 and the permission policy 224 associated with the age 222 of the guest user 110. Thus, the age 222 of the guest user 110 has to be determined before providing any access.

For determining the age 222 of the guest user 110, the device 102 may, at first, computes an axial length 216 and back scattering 218 from the current scanned eyeball image 212 of the guest user's 110 eye. According to embodiments, the axial length 216 of the guest user's 110 eye may be computed using a calibration technique of autorefractors. Whereas, the back scattering 218 may be computed using a tomographic retinal imaging technique. According to embodiments of present disclosure, the calibration technique of autorefractors and tomographic retinal imaging technique may be implemented by the device 102, for example smartphones. Equipped with high resolution cameras, the smartphones may leverage their infra-red (IR) scanning feature for various diagnostic purposes. An example of the computed axial length 216 and back scattering 218 for different age groups is shown in below table 1 and table 2 respectively.

TABLE 1

Axial length of different age group of users

| Age Group | Axial Length |
|---|---|
| Birth | 16.5 mm |
| 2 years | 21 mm |
| 3 years | 22.5-23 mm |
| 13 years | 24.2 mm |
| Further | Very minimal growth with age |

TABLE 2

Back Scattering of different age group of users

| Age Group | Straylight parameter (k) |
|---|---|
| <45 | ranged from 4.9 to 8.1 |
| >45 < 60 | 10.7 to 19.7 |
| >60 | Significantly high |

From the above tables, it may be observed that the axial length 216 of a newborn's eye may measure about 16.5 mm. During infancy, the eyeball grows just 1 millimeter, to a length of about 0.74 inches and continues to grow gradually throughout childhood until it reaches a length of about one inch in adulthood. Further, it may be also observed that for users below age of 45, the straylight parameter computed may be in a range from 4.9 to 8.1. The axial length 216 is used to determine the age group till adolescent stage and back scattering 218 is used to determine the old age group.

Once the axial length 216 and the back scattering 218 is computed, the device 102 may compare the axial length 216 and the back scattering 218 with pre-stored age comparison index 220. The pre-stored age comparison index 220 may comprise mapping between different age groups and corresponding axial length 216 and the back scattering 218, as shown in the above tables 1 and 2. Based on the comparison, the device 102 determines the age 222 of the guest user 110. Thus, based on the age 222 of the guest user 110 and the permission policy 224, the device 102 provides the restricted content access permission to the guest user 110. As described earlier, the permission policy 224 may include disabling of one or more contents 104, enabling of the one or more contents 104, disabling one or more functionalities 106 of the device 102, enabling the one or more functionalities 106 of the device 102, access time of the one or more contents 104, and access location of the one or more contents 104.

In one example, if the guest user 110 (Guest User 1) is a three to six-year old kid, the restricted content access may be imposed such that the kid may be allowed to play only offline games and listen to music. However, if the guest user 110 (Guest User 2) is a teenage between the age group thirteen to sixteen, the restricted content access may be imposed such that the teenager may access the browser application along with the of games and the music application. An example of such access based on different age groups is shown in below table 3.

TABLE 3

Access permission based on the age group

| Authenticity | Age Group | Access Permission |
|---|---|---|
| Authorized User | Any age | Complete Access of contents and functionalities |
| Guest User 1 | 3-6 | Offline Games, Music Application |
| Guest User 2 | 13-16 | Browser, Offline Games, Music Applications |
| Guest User 3 | 21-30 | News Applications, Browsers |

From the above table 3, it may be observed that "Guest User 3" which is in the age group of 21-30, the restricted content access may be imposed such that the news applications and browsers are accessible by the "Guest User 3". This way, the present disclosure prevents the guest user 110 to access any unwanted contents 104 which may not be appropriate for their age.

Figure 3:
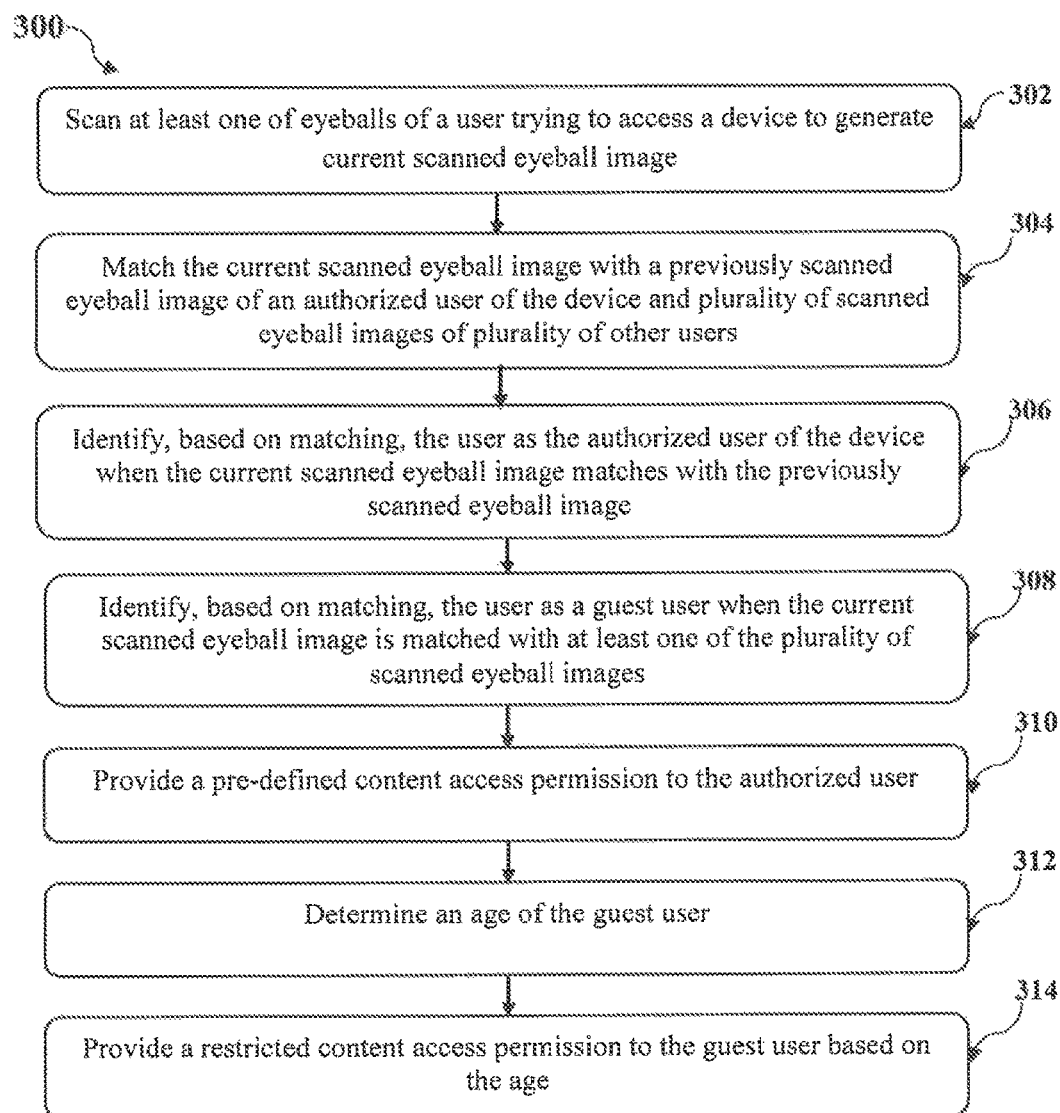
FIG. 3 is a flowchart illustrating a method of providing content access permission to a user of a device in accordance with some embodiments of the present disclosure.

FIG. 3 is a flowchart illustrating a method of providing content access permission to a user of a device in accordance with some embodiments of the present disclosure.

As illustrated in FIG. 3, the method 300 includes one or more blocks illustrating a method of providing content access permission to a user using a device 102. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 302, the method 300 includes scanning, by an image capturing unit 202 of the device 102, at least one of eyeballs of a user trying to access the device 102. The scanning results in generation of a current scanned eyeball image 212 (as explained above in FIG. 2).

At block 304, the method 300 includes matching, by the device 102, the current scanned eyeball image 212 with a previously scanned eyeball image of an authorized user 108 of the device 102 and plurality of scanned eyeball images of plurality of other users.

At block 306, the method 300 includes identifying, by the device 102, the user, based on the matching, as the authorized user 108 of the device 102 when the current scanned eyeball image 212 matches with the previously scanned eyeball image.

At block 308, the method 300 includes identifying, by the device 102, the user, based on the matching, as a guest user 110 when the current scanned eyeball image 212 is matched with at least one of the plurality of scanned eyeball images.

At block 310, the method 300 includes providing, by the device 102, a pre-defined content access permission to the authorized user 108. The pre-defined content access permission indicates complete access of the contents 104 and the functionalities 106 of the device 102.

At block 312, the method 300 includes determining, by the device 102, age of the guest user 110 based on processing of the current scanned eyeball image 212 relative to the at least one of the plurality of scanned eyeball images. The determination of the age is explained above in FIG. 2.

At block 314, the method 300 includes providing, by the device 102, a restricted content access permission (as explained above in FIG. 2) to the guest user 110 based on the age determined for the guest user 110 and permission policy associated with the age of the guest user 110.

Advantages of the Embodiment of the Present Disclosure are Illustrated Herein.

In an embodiment, the present disclosure provides a method for providing a content access of the device based on the age and authenticity of the user.

In an embodiment, the present disclosure provides a method of securely using the device without displaying any unwanted contents.

In an embodiment, the present disclosure is easy to implement using existing hardware capabilities in a device and uses eyeball size to determine age of the user for providing content access of the device.

The terms "an embodiment", "embodiment", "embodiments", "the embodiment", "the embodiments", "one or more embodiments", "some embodiments" and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | ENVIRONMENT |
| 102 | DEVICE |
| 104 | CONTENTS |
| 106 | FUNCTIONALITIES |
| 108 | AUTHORIZED USER |
| 110 | GUEST USER |
| 202 | IMAGE CAPTURING UNIT |
| 204 | PROCESSOR |
| 206 | MEMORY |
| 208 | DATA |
| 210 | MODULES |
| 212 | CURRENT SCANNED EYEBALL IMAGE |
| 214 | IMAGE DATABASE |
| 216 | AXIAL LENGTH |

-continued

| Reference Number | Description |
| --- | --- |
| 218 | BACK SCATTERING |
| 220 | PRE-STORED AGE COMPARISON INDEX |
| 222 | AGE |
| 224 | PERMISSION POLICY |
| 226 | OTHER DATA |
| 228 | MATCHING MODULE |
| 230 | IDENTIFYING MODULE |
| 232 | PERFORMING MODULE |
| 234 | OTHER MODULES |

The invention claimed is:

1. A method of providing content access permission to a user of a device, the method comprising:
scanning, by an image capturing unit of the device, at least one of eyeballs of the user trying to access the device, wherein the scanning results in generation of a current scanned eyeball image;
matching, by the device, the current scanned eyeball image with a previously scanned eyeball image of an authorized user of the device and plurality of scanned eyeball images of plurality of other users;
identifying, by the device, the user, based on the matching,
as the authorized user of the device when the current scanned eyeball image matches with the previously scanned eyeball image, and
as a guest user when the current scanned eyeball image is matched with at least one of the plurality of scanned eyeball images;
performing, by the device, based on the identifying, at least one of,
providing a pre-defined content access permission to the authorized user; and
determining an age of the guest user based on processing of the current scanned eyeball image relative to the at least one of the plurality of scanned eyeball images, and
providing a restricted content access permission to the guest user based on the age determined for the guest user and permission policy associated with the age of the guest user; wherein determining the age of the guest user comprises:
computing an axial length and back scattering, from the current scanned eyeball image, of the user's eye identified as the guest user, wherein the axial length of the user's eye is computed using a calibration technique of autorefractors, and wherein the back scattering is computed using a tomographic retinal imaging technique;
comparing the axial length and the back scattering with pre-stored age comparison index, wherein the pre-stored age comparison index comprises mapping between age and corresponding axial length and the back scattering; and
determining the age of the guest user based on the comparing.

2. The method as claimed in claim 1, wherein the permission policy comprises at least one of disabling of one or more contents, enabling of the one or more contents, disabling one or more functionalities of the device, enabling the one or more functionalities of the device, access time of the one or more contents, and access location of the one or more contents.

3. The method as claimed in claim 1, wherein the previously scanned eyeball image of the authorized user and the plurality of scanned eyeball images of the plurality of other users are pre-stored in an image database of the device.

4. The method as claimed in claim 1, wherein the authorized user with the predefined content access permission is provided with complete access of one or more contents stored in the device and one or more functionalities associated with the device.

5. The method as claimed in claim 1, wherein the guest user with the restricted content access permission is provided with selective access of one or more contents stored in the device and one or more functionalities associated with the device.

6. A device for providing content access permission to a user of the device, the device comprising:
an image capturing unit to scan at least one of eyeballs of the user trying to access the device, wherein the scanning results in generation of a current scanned eyeball image;
a processor; and
a memory communicatively coupled to the processor, wherein the memory stores processor-executable instructions, which, on execution, causes the processor to:
match the current scanned eyeball image with a previously scanned eyeball image of an authorized user of the device and plurality of scanned eyeball images of plurality of other users;
identify, the user, based on the matching,
as the authorized user of the device when the current scanned eyeball image matches with the previously scanned eyeball image, and
as a guest user when the current scanned eyeball image is matched with at least one of the plurality of scanned eyeball images;
perform, based on the identification, at least one of,
provide a pre-defined content access permission to the authorized user; and
determine an age of the guest user based on processing of the current scanned eyeball image relative to the at least one of the plurality of scanned eyeball images, and
provide a restricted content access permission to the guest user based on the age determined for the guest user and permission policy associated with the age of the guest user; wherein the device determines the age of the quest user by:
computing an axial length and back scattering, from the current scanned eyeball image, of the user's eye identified as the guest user, wherein the axial length of the user's eye is computed using a calibration technique of autorefractors, and wherein the back scattering is computed using a tomographic retinal imaging technique;
comparing the axial length and the back scatterinq with pre-stored age comparison index, wherein the pre-stored age comparison index comprises mapping between age and corresponding axial length and the back scattering; and
determining the age of the quest user based on the comparing.

7. The device as claimed in claim 6, wherein the permission policy comprises at least one of disabling of one or more contents, enabling of the one or more contents, disabling one or more functionalities of the device, enabling the one or more functionalities of the device, access time of the one or more contents, and access location of the one or more contents.

8. The device as claimed in claim 6, wherein the device comprises an image database for storing the previously scanned eyeball image of the authorized user and the plurality of scanned eyeball images of the plurality of other users.

9. The device as claimed in claim 6, wherein the authorized user with the pre-defined content access permission is provided with complete access of one or more contents stored in the device and one or more functionalities associated with the device.

10. The device as claimed in claim 6, wherein the guest user with the restricted content access permission is provided with selective access of one or more contents stored in the device and one or more functionalities associated with the device.

11. A non-transitory computer-readable storage medium including instructions stored thereon that when processed by at least one processor cause a device to perform operations comprising:
   scanning at least one of eyeballs of the user trying to access the device, wherein the scanning results in generation of a current scanned eyeball image;
   matching the current scanned eyeball image with a previously scanned eyeball image of an authorized user of the device and plurality of scanned eyeball images of plurality of other users;
   identifying, the user, based on the matching,
      as the authorized user of the device when the current scanned eyeball image matches with the previously scanned eyeball image, and
      as a guest user when the current scanned eyeball image is matched with at least one of the plurality of scanned eyeball images;
   performing, based on the identifying, at least one of,
      providing a pre-defined content access permission to the authorized user; and
      determining an age of the guest user based on processing of the current scanned eyeball image relative to the at least one of the plurality of scanned eyeball images, and
      providing a restricted content access permission to the guest user based on the age determined for the guest user and permission policy associated with the age of the guest user; wherein determining the age of the quest user comprises:
         computing an axial length and back scattering, from the current scanned eyeball image, of the user's eye identified as the guest user, wherein the axial length of the user's eye is computed using a calibration technique of autorefractors, and wherein the back scattering is computed using a tomographic retinal imaging technique;
         comparing the axial length and the back scattering with pre-stored age comparison index, wherein the pre-stored age comparison index comprises mapping between age and corresponding axial length and the back scattering; and
         determining the age of the quest user based on the comparing.

12. The medium as claimed in claim 11, wherein the permission policy comprises at least one of disabling of one or more contents, enabling of the one or more contents, disabling one or more functionalities of the device, enabling the one or more functionalities of the device, access time of the one or more contents, and access location of the one or more contents.

13. The medium as claimed in claim 11, wherein the previously scanned eyeball image of the authorized user and the plurality of scanned eyeball images of the plurality of other users are pre-stored in an image database of the device.

14. The medium as claimed in claim 11, wherein the authorized user with the pre-defined content access permission is provided with complete access of one or more contents stored in the device and one or more functionalities associated with the device.

15. The medium as claimed in claim 11, wherein the guest user with the restricted content access permission is provided with selective access of one or more contents stored in the device and one or more functionalities associated with the device.

* * * * *